United States Patent
Zhou

(10) Patent No.: US 10,174,703 B2
(45) Date of Patent: Jan. 8, 2019

(54) COMBINED HOMOGENEOUS COMPRESSION IGNITION AND DIFFUSED COMPRESSION IGNITION COMBUSTION CONTROL METHOD FOR LOW-OCTANE-VALUE GASOLINE

(71) Applicant: Xiangjin Zhou, Beijing (CN)

(72) Inventor: Xiangjin Zhou, Beijing (CN)

( * ) Notice: Subject to any disclaimer, the term of this patent is extended or adjusted under 35 U.S.C. 154(b) by 313 days.

(21) Appl. No.: 15/103,880

(22) PCT Filed: May 19, 2014

(86) PCT No.: PCT/CN2014/000507
§ 371 (c)(1),
(2) Date: Aug. 31, 2016

(87) PCT Pub. No.: WO2015/085645
PCT Pub. Date: Jun. 18, 2015

(65) Prior Publication Data
US 2016/0369735 A1    Dec. 22, 2016

(30) Foreign Application Priority Data
Dec. 13, 2013   (CN) .......................... 2013 1 0676615

(51) Int. Cl.
| | | |
|---|---|---|
| F02D 41/00 | (2006.01) | |
| F02D 41/30 | (2006.01) | |
| F01N 13/14 | (2010.01) | |
| F02D 41/40 | (2006.01) | |
| F01N 3/10 | (2006.01) | |

(52) U.S. Cl.
CPC ......... *F02D 41/3035* (2013.01); *F01N 3/101* (2013.01); *F01N 13/14* (2013.01); *F02D 41/402* (2013.01); *F02D 41/405* (2013.01); *Y02T 10/44* (2013.01)

(58) Field of Classification Search
CPC ... F02D 41/405; F02D 41/3035; F02D 41/402
See application file for complete search history.

(56) References Cited

U.S. PATENT DOCUMENTS

| | | | | |
|---|---|---|---|---|
| 5,740,775 A | * | 4/1998 | Suzuki ...................... | F02B 3/06 123/299 |
| 6,082,325 A | * | 7/2000 | Digeser ................. | F01N 3/0842 123/299 |
| 10,072,558 B2 | * | 9/2018 | Zhou ........................ | F02B 7/06 |
| 2002/0007816 A1 | * | 1/2002 | Zur Loye .................. | F02B 1/04 123/295 |
| 2004/0177609 A1 | | 9/2004 | Budinger et al. | |
| 2013/0125453 A1 | * | 5/2013 | Zhou ........................ | C10L 1/023 44/448 |
| 2013/0160729 A1 | * | 6/2013 | Zhou .................. | F02D 41/0025 123/1 A |
| 2016/0090930 A1 | * | 3/2016 | Yamaguchi ........... | F02D 41/023 701/104 |
| 2016/0123251 A1 | * | 5/2016 | Ochi ................... | F02D 41/3023 123/406.47 |
| 2017/0130667 A1 | * | 5/2017 | Uehara ............... | F02D 41/3035 |

FOREIGN PATENT DOCUMENTS

| | | |
|---|---|---|
| CN | 1603592 A | 4/2005 |
| CN | 101619670 A | 1/2010 |
| CN | 101946074 A | 1/2011 |
| CN | 10101943075 A | 1/2011 |
| CN | 102042068 A | 5/2011 |
| CN | 102900555 A | 1/2013 |
| WO | 2010105000 A1 | 9/2010 |

* cited by examiner

*Primary Examiner* — Hieu T Vo
*Assistant Examiner* — Sherman Manley
(74) *Attorney, Agent, or Firm* — Liu Law Office; Helen S. Liu

(57) ABSTRACT

Disclosed is a homogeneous charge compression ignition and diffusion compression ignition combined ignition control method for low-octane gasoline, using a diffusion compression ignition control mode as a forced ignition measure, to ignite a premixed homogeneous lean oil and gas mixture, and meanwhile to achieve homogeneous charge compression ignition of the oil and gas mixture. During an intake stroke, a fuel is partially injected into the cylinder or an intake manifold, to form a low-concentrated, homogeneous, premixed oil and gas mixture. Before the piston reaches a top dead center during the compression stroke, the remaining part of fuel is injected into the cylinder, diffuses in the air, and spontaneously ignites, thus achieving diffusion compression ignition. A flame is generated in the diffusion compression ignition, and ignites the premixed oil and gas mixture in the cylinder, to achieve ignition and combustion of the homogeneous lean fuel. As the temperature and the pressure rise in the cylinder, multi-point spontaneous ignition occurs within the homogeneous lean oil and gas mixture, thus achieving homogeneous charge compression ignition. Such a combined ignition control method achieves a high compression ratio, lean combustion, stratified combustion, and fast combustion, without causing any knocks. Also disclosed are an insulation method of an internal combustion engine exhaust system, and a product thereof.

7 Claims, No Drawings

COMBINED HOMOGENEOUS COMPRESSION IGNITION AND DIFFUSED COMPRESSION IGNITION COMBUSTION CONTROL METHOD FOR LOW-OCTANE-VALUE GASOLINE

FIELD OF THE INVENTION

The present invention relates to the field of internal combustion engines in the mechanical industry.

BACKGROUND OF THE INVENTION

An internal combustion engine is a mature technology, and typically comprises combustion components such as a cylinder, a piston, and a valve, a connecting rod and crankshaft mechanism, a gas distribution and fuel supply system, a ventilation and exhaust gas treatment system, etc. The working principle of the internal combustion engine is well known in the art.

Internal combustion engines can generally be divided into ignition gasoline engines and compression ignition diesel engines.

Only one combustion control mode, i.e., either ignition or compression ignition, is typically employed in one power stroke of the internal combustion engine.

A conventional gasoline engine uses a homogeneous oil and gas ignition and combustion control mode, which is subjected to the defect of slow flame spreading in a time period from ignition of the spark plug to complete combustion of the oil and gas, thereby easily leading to knocks. As a result, it is difficult to achieve a high compression ratio and lean burning, which results in low thermal power conversion efficiency.

A conventional diesel engine adopts an inhomogeneous ignition and combustion control (diffusion compression ignition) mode, which is subjected to the drawback of existence of relatively much soot in the exhaust gases of combustion, thereby causing a waste of fuel. Under heavy load conditions, the problem of emissions of soot and other particulate impurities is especially prominent. In addition, the engine is heavy and operates rather roughly.

Over the past 10 years, homogeneous charge compression ignition gasoline engines have been studied, wherein a multi-point ignition mode is used, and the combustion velocity and the temperature in the combustion chamber are meanwhile controlled, to avoid knocks. Although the engine acquires an increased compression ratio, and lean burning can be realized, such an internal combustion engine can only operate under a relatively fixed, small range of load. Substantial variation in load or rotating speed will cause significant reduction in the thermal power conversion efficiency, or cause knocks. As a result, such engines have rather a narrow utilization range, and have not been used in large scales until now. Moreover, this kind of engine has relatively low power per liter.

Up till now, there is not an internal engine, which uses one single fuel, and can adopt both the diffusion compression ignition control mode and the homogeneous charge compression ignition control mode within one power cycle of the cylinder.

SUMMARY OF THE INVENTION

The present invention comprises three major parts: I. a homogeneous charge compression ignition and diffusion compression ignition combined ignition control method for low-octane gasoline, and an internal combustion engine using such an ignition control method; II. an insulation method of an internal combustion engine exhaust system; and III. an insulation product of the internal combustion engine exhaust system, comprising a vacuum insulation jacket assembly (used for covering and wrapping outer surfaces of exhaust pipes and exhaust gas treatment devices), an exhaust pipe having a vacuum sandwich, a turbocharger having a vacuum jacket housing in an exhaust-driven portion thereof, a three-way catalytic exhaust gas treatment device having a vacuum jacket housing, and an exhaust soot (removing) treatment device having a vacuum jacket housing.

I. The Homogeneous Charge Compression Ignition and Diffusion Compression Ignition Combined Ignition Control Method for Low-Octane Gasoline 1. Technical Features and Steps of the Homogeneous Charge Compression Ignition and Diffusion Compression Ignition Combined Ignition Control Method for Low-Octane Gasoline The compression ratio of a cylinder is in the range from 12:1 to 22:1, typically 17:1. A single fuel, such as low-octane gasoline with an octane number (research octane number, RON for short) lower than 69, typically with an octane number of 40, or a fuel similar to such gasoline is used.

The fuel is injected in two stages, including a first stage termed pre-injection stage and a second stage termed primary injection stage. The pre-injection stage can be completed in either one single injection or in two or a plurality of injections. If the pre-injection stage includes one single injection only, such an injection occurs during an intake stroke of an internal combustion engine. A part of the fuel is injected into the cylinder or into an intake manifold, to be premixed with air. Because this part of the fuel and the air start to mix relatively early, an oil and gas mixture with a relatively fine homogeneity can be obtained. If the pre-injection stage is completed in a plurality of injections, a first injection thereof still occurs during the intake stroke of the internal combustion engine, while a second or third injection thereof occurs during a compression stroke after a piston passes a bottom dead center and before the primary injection stage occurs. That is, if there are more than two injections during the pre-injection stage, a last injection thereof occurs during the compression stroke after the piston passes the bottom dead center and before the primary injection stage occurs, while other injections than the first and the last injections occur between the first and the last ones. The primary injection stage occurs during the compression stroke. Before the piston approaches a top dead center, a part of the fuel is injected into the cylinder, followed by diffusion and spontaneous ignition of an oil and gas mixture containing such fuel in high-temperature and high-pressure air in the cylinder. Firing (ignition) time (phase) is controlled, through control of injection time (phase) of the primary injection stage, in accordance with such a principle that an exothermic center of combustion is positioned after and as close as to the top dead center of a power stroke.

In fact, the fuel injected during the primary injection stage enters a low-concentrated, premixed oil and gas mixture. The oil and gas mixture that diffuses and spontaneously ignites comprises a part of the fuel injected into the cylinder and premixed with the air in the pre-injection stage. Subsequently, the oil and gas mixture that spontaneously ignites generates a flame to ignite a non-ignited portion of the oil and gas mixture which is formed by the fuel injected and premixed with the air during the pre-injection stage.

Because of high ignition strength and multi-point ignition, the premixed oil and gas mixture which is previously difficult to ignite due to a low concentration of fuel and a high air-fuel ratio, is now successfully ignited. The premixed oil and gas mixture is combusted at a rather high rate under multi-point ignition, without leading to any phenomenon of detonation or knock due to the low concentration of fuel therein.

In order to prevent detonation and knock of the premixed oil and gas mixture, it is favorable to include a plurality of fuel injections during the pre-injection stage, so as to reduce homogeneity of the premixed oil and gas mixture, and generate an irregular concentration gradient and turbulence therein during diffusion of the fuel. Due to inhomogeneous fuel concentrations in the premixed oil and gas mixture, and different time points at which the fuel is injected into the cylinder, the fuel first injected into the cylinder, in a relatively long-term mixing with the air, will be partially pre-oxidized to release heat, and after the piston passes the top dead center (before the fuel injected in the primary injection stage ignites) during the compression stroke, the oil and gas mixture formed by the fuel injected during the pre-injection stage will be in a metastable state. Once the fuel injected during the primary injection stage is diffused and compressively ignited, the temperature and the pressure rise in the cylinder, such that multi-point ignition will occur within the premixed lean oil and gas mixture, thus achieving homogeneous charge compression ignition. Up till now, the present invention has achieved diffusion compression ignition (non-homogeneous charge compression ignition) and homogenous charge compression ignition combined ignition control method during one power stroke of the internal combustion engine.

Through a technical solution of partial recycling of exhaust gases or partial retention of the exhaust gases in the cylinder, the temperature of the premixed oil and gas mixture will rise, and be subjected to regional inhomogeneity. This can play a similar role as inhomogeneous concentrations of fuel in the premixed oil and gas mixture. A recycling ratio of the exhaust gases and a control manner thereof are known in the art.

It should be noted in implementation: 1) the phase of the last injection in the pre-injection stage is required to be sufficiently far from the top dead center, so as to prevent the fuel from being compressively ignited in an intensively-compressed high-temperature and high-pressure zone; and 2) an accumulative concentration of fuel in the pre-injection stage should be lower than a concentration that enables spontaneous ignition.

Realization or implementation of the above two notes, and selection and determination of time point of the injection performed during the primary injection stage are known in the art, and relevant control parameters thereof can be acquired or determined through bench tests. Various combustion elements of the cylinder, mainly including the compression ratio, the octane number of the fuel, rotating speed, and injected amount of fuel, will influence setting of the time for the injection of the primary injection stage.

The amount of fuel injected (distribution ratios between and among multiple injections of fuel) should be restricted by a minimum injection amount of the fuel injector. That is, the amount of each injection should be larger than the minimum injection amount. Otherwise, the fuel injection cannot be performed.

The essential point of control in the present invention is to prevent spontaneous ignition of the premixed oil and gas mixture in the aforementioned metastable state before the piston passes the top dead center during the compression stroke. In order to increase a stability factor of such a metastable state, a universal characteristic test can be conducted, to obtain minimum concentration data of a fuel (with a specific octane number) under various specific combustion element conditions of a cylinder. A redundancy coefficient can be determined on such a basis, to reduce a control value of the concentration in practice. Of course, to excessively decrease the concentration will decrease power (torque) output performance of the engine.

Gasoline first injected into the cylinder is premixed with the air, and the air-fuel ratio of the oil and gas mixture has a minimum value, as a lower limit, that enables non-occurrence of knocks during combustion, and a maximum value, as an upper limit, that enables smooth combustion after ignition. The air-fuel ratio of the premixed oil and gas mixture should also guarantee non-occurrence of spontaneous ignition during a compression stage. An actual control value should be an experimental value added with a redundancy or shrinkage redundancy.

The inventor will, based on his experience, further provide the following technical elements to those in the art for implementation of the present invention.

As the octane number of the fuel decreases, the proportion of an accumulative amount of fuel injected during the pre-injection stage also decreases in a total amount of fuel consumed in each power stroke, so as to avoid rough operations of the engine. If the accumulative amount of fuel to be injected during the pre-injection stage cannot be distributed into a plurality of injections, the fuel should be injected in one injection. When the pre-injection stage has one single injection only, under the same conditions, the earlier the phase of the injection (the longer the time interval from the pre-injection stage to the primary injection stage), the higher the efficiency of the engine will be, and the more easily the phenomenon of rough operations of the engine will occur. A postponed pre-injection stage would reduce the efficiency of the engine. When the pre-injection stage has one single injection only, the phase of such an injection can be arranged in the compression stroke also, before the piston reaches the top dead center and before the primary injection stage. This can be beneficial in that the proportion and amount of fuel injected during the pre-injection stage can be properly added, without easily causing rough operations of the engine. This facilitates improvement of the output power of the engine, at the cost of a decrease in thermal power conversion efficiency of the engine though. As can be seen, it is necessary for those in the art to select a proper control solution and proper control parameters by comprehensive balances between and among four indexes including efficiency of the engine, maximum output power of the engine, mechanical strength of the engine, and properties of exhaust emissions. One should make appropriate compromises where necessary, instead of excessively seeking one advanced index only. It is suggested that, during a high-load operation, the accumulative amount of fuel injected during the pre-injection stage should not extend 50% of the total amount of the fuel, unless two types of fuels are employed and high-octane gasoline is used in the pre-injection stage. Experimental data show that, under the same conditions, the pre-injection stage completed in a plurality of injections is superior to that completed in one single injection in terms of effects. In other words, the pre-injection stage should be completed in a plurality of injections if possible.

During a low-load operation, the operation of the engine is controlled as per a single diffusion compression ignition control mode, which means that only the primary injection of the fuel occurs, without occurrence of any pre-injection or supplementary injection. Because a fuel injector requires a minimum amount of fuel for each injection, it is impossible to distribute a small total amount of fuel into two or more injections during the low-load operation. In connection with a diffusion compression ignition control mode of a single low-octane gasoline, and a gasoline engine, the inventor of the present invention has a granted patent ZL 201010227388.0, entitled compression ignition low-octane gasoline engine.

As a supplementary or optimized solution of the above technical solution, one or more of the following technical solutions can be selected:

1) partially recycling the exhaust gases, which are mixed with fresh air, and enter the cylinder, or partially retaining the exhaust gases in the cylinder during an exhaust procedure;

2) increasing intake pressure of the cylinder with a turbocharger or a mechanical supercharging device, or with the turbocharger and the mechanical supercharging device simultaneously;

3) using, in a low-temperature start-up or low-load operation stage, a conventional spark plug ignition and combustion control mode;

4) pre-heating air with an electric heater in a low-temperature start-up stage; and 5) arranging a fuel heater to preheat the fuel when the ambient temperature is low, for example, in winter, so that, after being injected into the cylinder, the fuel can be more easily diffused, or can more easily ignite in case of the primary injection stage.

The above five technical solutions are all known in the art.

In view of the above homogeneous charge compression ignition and diffusion compression ignition combined ignition control method, the technical solution of the present invention can be further developed as follows.

(1) The fuel can be injected in three stages, specifically including a pre-injection stage, a primary injection stage, and a supplementary injection stage. The pre-injection stage can be completed in one injection or in two or three injections. A first injection in the pre-injection stage occurs during the intake stroke. When the pre-injection stage is completed in a plurality of injections, a last injection occurs during the compression stroke before the primary injection stage. A second stage is termed the primary injection stage, which occurs during the compression stroke before the piston reaches the top dead center, to achieve diffusion compression ignition. A phase of the primary injection determines ignition time, in accordance with such a principle that an exothermic center is positioned after and as close as to the top dead center. A third stage is termed the supplementary injection stage, which occurs during the power stroke after the piston passes the top dead center by 0-60° CA. The phase and the proportion of fuel to be injected in the supplementary injection stage are dependent on the structure of a combustion chamber and the rotating speed of the engine. Typically, the amount of fuel injected in the supplementary injection stage accounts for 0-50% of a total amount of the fuel injected, while the amount of fuel injected in the primary injection stage accounts for 20-100% of the total amount of the fuel injected.

Where a fuel injector is vertically arranged at a top center of the combustion chamber, and the piston is provided with a recess at a top thereof, a typical phase of the supplementary injection of fuel occurs during the power stroke after the piston passes the top dead center by a 1° CA or a 41° CA. The proportion of fuel injected generally does not go beyond 50%, typically being 20%.

2) Two fuel injectors are used to inject fuel into each cylinder, and the same fuel is injected, so as to facilitate achievement of a plurality of injections in a high-speed operation state of the engine. In the prior art, one fuel injector is used, such that when the engine rotates at a high speed (e.g., higher than 3000 r/min), it is difficult to achieve a plurality of injections, i.e., more than two injections, in the pre-injection stage, on condition that one injection in the primary injection stage is ensured.

3) Two fuel injectors are used for each cylinder to inject fuel, and two types of gasoline with different octane numbers (RONs), such as 45 and 93, are injected. One of the fuel injectors is used to inject the high-octane gasoline, which is thus premixed with air; and the other of the fuel injectors is used to inject the low-octane gasoline in the primary injection stage. The injection phase of the low-octane gasoline occurs during the compression stroke before the piston reaches the top dead center, wherein the low-octane gasoline is diffused and compressively ignited, and then ignites the premixed gas and oil mixture containing the high-octant gasoline.

4) Two types of gasoline with different octane numbers (RONs), e.g., 50 and 97, respectively, and meanwhile two fuel injectors with different injection pressures are used. The low-pressure fuel injector is used to inject fuel into an intake manifold or intake duct, which constitutes the pre-injection stage. The high-pressure fuel injector, as the injector of the primary injection stage, or as both the injector of a part of a plurality of injections in the pre-injection stage and the injector of the primary stage, is used to inject fuel into the cylinder.

5) Two types of gasoline with different octane numbers are injected, and two fuel injectors are used for each cylinder, respectively injecting high-octane gasoline in the pre-injection stage, and low-octane gasoline in the primary injection stage. Meanwhile, a low-pressure fuel injector is further used to inject high-octane gasoline into the intake manifold or intake duct, as a part of the pre-injection stage. The benefit to arrange the injection outside of the cylinder during the pre-injection stage lies in that, two fuel injectors can be used during the pre-injection stage, i.e., a low-pressure one and a high pressure one, such that the frequency of injections during the pre-injection stage can be increased to three or more, including one low-pressure injection and two high-pressure injections. During the low pressure injection, the fuel is mixed with air and enters the cylinder with the air. Based on the performance of the fuel injectors, the high-pressure injections both occur during the compression stroke, or alternatively, one of the high-pressure injections occurs during the intake stroke and the other occurs during the compression stroke. The two high-pressure injections during the pre-injection stage can both occur during the compression stroke also.

6) As a technical solution to prevent knocks or rough operations, a knock detection sensor (the prior art) can be mounted on a wall of each cylinder. When knocks are detected (in the prior art, it can be affirmed that knocks occur upon continuous detection of four or six knocks), they can be eliminated through delay of the phase of the primary injection, or decrease in the amount of fuel injected during the pre-injection stage, or through both of the these two approaches.

It is the prior art to manufacture or modify the internal combustion engine according to the above homogeneous charge compression ignition and diffusion compression ignition combined ignition control method, and the developed technical solutions of any one of the above items (1)-(6).

It should be noted that the combustion elements of a cylinder include but are not limited to intake pressure (intake amount), intake temperature, ambient temperature, tank temperature, oil temperature, rotating speed, spark plug ignition phase angle (ignition time), injection amount of fuel (each time), fuel injection pressure, fuel injection phase angle, compression ratio, torque output, and whether or not knocks occur. Some parameters are controllable, and some others, as inherent qualities of the device, although cannot be controlled or varied, influence selection of the controllable parameters in a significant manner.

The lowest amounts of low-octane gasoline required to be injected into the cylinder for achievement of compression ignition (in the primary injection stage) under different conditions can be determined through bench tests or the prior art, which does not involve any creative work. The upper and lower limits of the air-fuel ratios in the premixed oil and gas mixture injected into the cylinder under different conditions (various operating conditions and loads) can be determined through bench tests or the prior art, which involves no creative work.

In the present invention, the term "gas supply" means supply of air, and the air-fuel ratio refers to the ratio of air to fuel. The structure, operating principles, and the like of the internal combustion engine in connection with the present invention are well known by those skilled in the art, and will therefore not be explained in detail herein.

2. Distinguishing Features of the Homogeneous Charge Compression Ignition and Diffusion Compression Ignition Combined Ignition Control Method for Low-Octane Gasoline Over the Prior Art 1) The homogeneous charge compression ignition and diffusion compression ignition combined ignition control method for low-octane gasoline of the present invention is different from an existing method or internal combustion engine using low-octane gasoline compression ignition combined with multi-stage fuel injection.

According to the existing method, which uses a low-octane fuel, and diffusion ignition as a forced ignition measure, the fuel is injected in one single injection, or in multiple injections without a pre-injection stage, but only with a primary injection stage and a supplementary injection stage. Due to such a different injection manner, the performance of the existing engine is significantly different from the engine of the present invention.

Reference can be made to Tsinghua University's Patent application 2012103811406.X, entitled "Multi-stage pre-mixing compression ignition method of low-octane gasoline fuel." The term "pre-mixing" in the reference patent application refers to a time interval from the beginning of injection to ignition. During such a time interval, fuel will be diffused in the air and mixed with the air. On other occasions, the inventor of the reference patent application named such "pre-mixing" "partial pre-mixing" (see thesis "Combustion and Emission Characteristics of Low-octane Gasoline in Partial Diffusion Compression Ignition," *Journal Automotive Safety and Energy* of Tsinghua University, Vol. 2, No. 4, December, 2011; this thesis, as attached, was entitled "Experimental Study on Partial Pre-mixing Compression Ignition and Combustion Mode of Low-octane Gasoline" during the 2011 Annual Conference of the Combustion, Energy-saving, and Purification Sub-society of the Chinese Society for Internal Combustion Engines). The terms "pre-mixing" and "partial pre-mixing" in the above reference documents are different from the term premixing of the present invention.

2) The homogeneous charge compression ignition and diffusion compression ignition combined ignition control method for low-octane gasoline of the present invention is different from the homogeneous charge compression ignition (HCCI) of gasoline.

At the outset, the fuels used are different. In the present invention, low-octane gasoline is used, while high-octane gasoline, the higher the better, is used for HCCI. Besides, the compression ratios of the cylinders are different. The compression ratio of the cylinder according to the present invention can reach 18:1 to 22:1, while that of the cylinder in the technology of HCCI, is generally in the range from 12:1 to 15:1, in order to prevent knocks. Moreover, different ignition reliabilities are presented. According to HCCI of gasoline, a fuel is premixed with air, and exhaust gases are partially recycled to improve the inlet temperature. During the intake stroke and the compression stroke, the fuel is pre-oxidized and releases heat. A premixed oil and gas mixture achieves spontaneous ignition after the piston passes the top dead center during the compression stroke. Such a procedure is subjected to poor ignition reliability. The present invention employs forced ignition, i.e., diffusion compression ignition of the fuel injected during the primary stage in the air, to generate a flame, which ignites the homogeneously premixed oil and gas mixture and enables multi-point ignition within the homogeneous oil and gas mixture. Homogeneous charge compression ignition can thus be achieved. Furthermore, the performances of the engines are different. The internal combustion engine of the present invention has a rather broad workload, and the load and rotating speed can vary within a limit, without causing knocks. However, the workload of the HCCI internal combustion engine can vary only within a small range, such that the HCCI gasoline engine can still not be used as a direct power plant of an automobile.

3. Technical Advantages of the Homogeneous Charge Compression Ignition and Diffusion Compression Ignition Combined Ignition Control Method for Low-Octane Gasoline 1) The maximum output power of the engine can be improved. As the utilization efficiency of air in the cylinder is improved, the power per liter of the internal combustion engine according to the method of the present invention extends that of the engine according to a single diffusion compression control procedure, and that of the engine according to a single HCCI procedure. With a same displacement, the maximum output torque and maximum output power of the engine of the present invention are both increased.

Theoretically, the maximum output power of the engine of the present invention will extend that of a diesel engine with a same displacement, at a lower specific fuel consumption.

2) The emission of soot can be decreased. As the fuel is injected in the pre-injection stage and the primary injection stage, the amount of fuel injected each time will be lower than the amount of fuel injected in the single diffusion compression ignition. Compared with the diffusion compression ignition control mode having one single injection, when the fuel injected during the primary injection stage of the present invention ignites, there will be a relatively low concentration of fuel in a fuel injection and atomization central region, a relatively low content of soot in the exhaust gases, and a decreased specific fuel consumption of the engine.

3) The ignition reliability is superior to that of HCCI. Compared with the single gasoline HCCI technology, the rotating speed and load of the engine of the present invention can be adjusted below a highest rotating speed and a highest output power, respectively, without causing knocks easily. Meanwhile, the advantages of the gasoline HCCI technology are substantially reserved in the method of the present invention.

4) The fuel injected during the pre-injection stage has a broad range of octane numbers. The gasoline HCCI technology requires use of high-octane gasoline, typically higher than or equal to 93 (92 in Beijing). According to the present invention, however, the octane number of the gasoline injected during the pre-injection stage can range from −30 to 105. Of course, the control parameters of the engine should be selected (via universal characteristic test) according to the specific octane number of a fuel.

II. The Insulation Method of the Internal Combustion Engine Exhaust System and the Insulation Product With respect to an internal combustion engine using compression ignition and lean combustion control mode, the temperature of the exhaust gases is lower than that of the exhaust gases produced in an ignition gasoline engine, while a relatively high pressure of exhaust gases is necessary for a turbocharger. Insulation of the exhaust system is beneficial for maintaining a relatively high pressure of the exhaust gases, and for the turbine to work effectively. On the other hand, the three-way catalytic exhaust gas treatment device (for removing carbon monoxide, hydrocarbons, and oxynitrides from the exhaust gases), and the exhaust soot (removing) treatment device also require a relatively high temperature of the exhaust gases, generally higher than 500° C., such that carbon monoxide, hydrocarbons, oxynitrides, and soot can be effectively removed from the exhaust gases. Therefore, it is rather necessary to insulate the exhaust manifold of a relevant internal combustion engine, the exhaust-driven portion of the turbocharger (except the working portion for compressing air), the three-way catalytic treatment device, the soot treatment device, the connecting pipes from the housing of the internal combustion engine to the turbocharger, the three-way catalytic treatment device, and the soot treatment device, and some pipes following the three-way catalytic treatment device or the soot treatment device.

A frequently used insulation method comprises wrapping a high-temperature-resistant or fireproof material around the exhaust system. Specific insulation procedures and materials are known in the art.

1. Technical Features and Steps of the Insulation Method of the Internal Combustion Engine Exhaust System Portions of all pipes and devices of the internal combustion engine exhaust system that are suitable for performance of insulation measures and located between an exhaust gas inlet of an exhaust manifold and an exhaust gas outlet are insulated, to prevent heat loss or heat diffusion into an engine camber of the engine to generate a high temperature therein. The portions necessary to be insulated are covered and wrapped with an insulation material.

Alternatively, the exhaust manifold of the internal combustion engine, the exhaust-driven portion of the turbocharger, the three-way catalytic treatment device, the soot treatment device, the connecting pipes from the housing of the internal combustion engine to the turbocharger, the three-way catalytic treatment device, and the soot treatment device, and some pipes following the three-way catalytic treatment device or the soot treatment device are insulated, respectively.

Alternatively, the housing of the internal combustion engine connected to the exhaust manifold is simultaneously insulated.

A hose in the exhaust system is insulated by being covered and wrapped with a soft insulation material.

Insulation materials suitable for the present invention include but are not limited to glass fiber fabric and filler composite insulation material, basalt fiber material, silicate foam material, etc. The insulation materials should excel in high temperature resistance, fire resistance, and thermal stability. Selection of specific insulation material and specific operating steps for insulation are known in the art.

2. Distinguishing Features of the Insulation Method of the Internal Combustion Engine Exhaust System Over the Prior Art In the prior art, a sheet metal is usually used to cover a portion of the exhaust system, which is of an inferior insulation effect. According to the present invention, however, a material with low thermal conductivity is used as the insulation material, and the exhaust pipes and devices are covered and wrapped, instead of being covered only.

3. Technical Advantages of the Insulation Method of the Internal Combustion Engine Exhaust System Heat dissipation from the exhaust gases in the internal combustion engine to the engine camber of the engine is prevented or relieved, thereby preventing plastic and rubber products in the engine camber of the engine from being aged or catching fire. More energy of the exhaust gases can thus be used to drive the turbocharger. Compared with the internal combustion engine using the compression ignition and combustion control mode, and providing insufficient power to the turbocharger due to a high air-fuel ratio and low temperature of the exhaust gases, the internal combustion engine using the method of the present invention has dual advantages.

III. The Insulation Product of the Internal Combustion Engine Exhaust System

1) The present invention provides an insulation product of the internal combustion engine exhaust system, with the following technical features.

A vacuum insulation jacket assembly is manufactured with a sheet metal material, for covering or wrapping outer surfaces of exhaust pipes or devices necessary to be insulated. In response to complex configurations of the devices such as the exhaust pipes and the turbocharger, the vacuum insulation jacket assembly is divided into multiple sections, which are successively connected and mounted according to the run of the pipes. A vacuum insulation jacket section impossible to be mounted as a sleeve is divided into two or more parts, which are combined or coupled with the outer surfaces of the pipes or devices necessary to be insulated. Thus, the outer surfaces of the pipes or devices to be insulated can be fully covered. The vacuum insulation jacket assembly is provided with a gap or a hole, as a position reserved for a support or a hanging rod necessary when the exhaust system is to be mounted or fixed to an automobile or other facilities. The vacuum insulation jacket assembly or components thereof is fixed or connected by hoops, nuts and bolts, or other means known in the art.

In specific implementing steps, some portions of the exhaust system can be left uninsulated, such as all exhaust system components following the soot treatment device, or all exhaust system components following the turbocharger (the turbocharger excluded).

2) According to the insulation method which comprises manufacturing a vacuum insulation jacket assembly with a sheet metal material, to wrap the outer surfaces of the exhaust system, the present invention provides a vacuum jacket internal combustion engine exhaust pipe, which has the following technical features.

A sealed sandwich pipeline structure is used to insulate the exhaust gases. A sandwich layer is pumped into vacuum during manufacture of the exhaust pipe, and maintained to be relative vacuum while the exhaust pipe is being used. The exhaust gases pass through the exhaust pipe, and can be insulated as heat transferred to an inner wall of the exhaust pipe from the exhaust gases cannot be transferred to an outer wall of the exhaust pipe easily, due to an insulating effect of the vacuum. The vacuum sandwiched between the inner wall and the outer wall of the exhaust pipe plays an insulating role.

The vacuum jacket internal combustion engine exhaust pipe includes but is not limited to an exhaust manifold, a silencer, and a pipe connecting various devices and components of the exhaust system.

In specific implementing steps, some portions of the exhaust system can be left uninsulated, such as all exhaust system components following the soot treatment device, or all exhaust system components following the turbocharger (the turbocharger excluded).

3) Based on the above insulation method of an internal combustion engine exhaust system, the present invention provides a turbocharger, wherein an outer surface of an exhaust-driven portion of the turbocharger is added with a vacuum jacket housing made of a metal sheet material. A sandwich layer of the vacuum jacket housing is maintained to be relative vacuum therein, and used for insulation.

4) Based on the above insulation method of an internal combustion engine exhaust system, an internal combustion engine three-way catalytic exhaust gas treatment device is provided in the present invention. An outer surface of the three-way catalytic exhaust gas treatment device is added with a vacuum jacket housing made of a metal sheet material. A sandwich layer of the vacuum jacket housing is maintained to be relative vacuum therein, and used for insulation.

5) Based on the above insulation method of an internal combustion engine exhaust system, an internal combustion engine exhaust soot treatment device is provided in the present invention. An outer surface of the exhaust soot treatment device is added with a vacuum jacket housing made of a metal sheet material. A sandwich layer of the vacuum jacket housing is maintained to be relative vacuum therein, and used for insulation.

The methods of manufacturing the vacuum insulation jacket assembly or the exhaust pipe having the vacuum sandwich, and the turbocharger, the three-way catalytic exhaust gas treatment device, and the exhaust soot (removing) treatment device each having their own vacuum jacket housings, all in the exhaust system, are known in the art. Generally, a workpiece is pre-processed in the atmospheric environment, with a gap or a hole reserved at a sealing position of the vacuum sandwich. The workpiece is then placed into a vacuum environment, so as to enable an inner portion of the jacket or the sandwich to be in a relative vacuum state, followed by welding and sealing of the above gap or hole in the vacuum environment.

DETAILED DESCRIPTION OF THE EMBODIMENTS

EXAMPLE 1

In a four-stroke, four-cylinder turbocharged gasoline engine, with a cylinder bore of 76 mm, displacement of 1.5 L, compression ratio of 16.8:1, fuel injection pressure of 12 MPa, and a minimum fuel injection pulse width of 400 µs, low-octane gasoline with an octane number (RON) of 50 was used. When a rotating speed was 2000 r/min, and an intake pressure was 240 KPa, the phase of a first injection performed in a pre-injection stage was in an intake stroke when the piston passed a top dead center by a 60° crank angle (CA); the phase of a second injection performed during the pre-injection stage was in a compression stroke when the piston passed a bottom dead center by a 40° CA; and the phase of an injection performed during the primary injection stage (a third injection) was in the compression stroke when the piston passed the bottom dead center by a 130° CA (50° CA before the piston reached the top dead center). The proportions of fuel injected in the three injections were 20%, 20%, and 60%, respectively. A total fuel injection pulse width was 2200 µs, and the air-fuel ratio was 52:1. The torque output of the engine was 93 N·m, and the specific fuel consumption was 205 g/(kW·h).

When the fuel injected during the primary injection stage (the third injection) entered the cylinder, the piston was approaching the top dead center, such that the temperature and the pressure in the cylinder rose beyond a temperature for spontaneous ignition of the fuel. After the piston passed the top dead center, the fuel spontaneously ignited in diffusion, thus achieving diffusion compression ignition, and generating a flame. When such a flame ignited a homogeneous premixed oil and gas mixture, the fuel injected in the first injection during the pre-injection stage was homogeneously mixed with air, while the fuel injected in the second injection during the pre-injection stage was inhomogeneously mixed with air, such that the concentration of fuel in the relatively homogeneous oil and gas mixture containing the fuel injected in the first and second injections performed during the pre-injection stage was subjected to inhomogeneity. As a result, the burning rate of the ignited homogeneous oil and gas mixture was inhomogeneous, which was a favorable result expected in the present invention. Similarly, due to inhomogeneous concentration of fuel in the homogeneous oil and gas mixture, when the temperature and the pressure in the cylinder further rose because of combustion (diffusion compression ignition and homogeneous ignition), the homogeneous (lean) oil and gas mixture reached a temperature for spontaneous ignition first at positions where the concentration of fuel was relatively high (the lower the concentration of fuel in the oil and gas mixture, the higher the conditions required for spontaneous ignition), thus forming multiple-point ignition within the homogeneous lean fuel. Subsequently, the homogeneous oil and gas mixture ignited at positions where the concentration of fuel was relatively low, so as to achieve homogeneous charge compression ignition of gasoline. The combustion steps can be generally summarized as follows: diffusion compression ignition of the fuel injected during the primary injection stage (including a small amount of fuel injected during the pre-injection stage)→ignition of fuel injected during the pre-injection stage→homogeneous charge compression ignition of the fuel injected during the pre-injection stage. Such homogeneous charge compression ignition, with the ignition time being controlled by the time of diffusion compression ignition, belongs to forced ignition and is of high stability, and therefore is superior to the homogeneous charge compression ignition (HCCI) of gasoline.

During cold start of a vehicle in winter, an electric heater (or an electric rod) can be used to heat the compressed air in the cylinder. Alternatively, a spark plug can be used to pre-heat the engine under an ignition and combustion control mode, so as to maintain cold running of the vehicle.

EXAMPLE 2

In a four-stroke, four-cylinder internal combustion engine, with a compression ratio of 18:1, cylinder bore of 82.5 mm, piston stroke of 97.6 mm, and cylinder displacement of 2.0 L, gasoline with an octane number of 93 was used as a fuel to be injected during a pre-injection stage, and low-octane gasoline with an octane number of 40 was used as a fuel to be injected during a primary injection stage. Each cylinder was provided with two fuel injectors, the injection pressures of which were both 20 MPa. One fuel injector (A) was used to inject No. 93 gasoline, and the other fuel injector (B) was used to inject No. 40 gasoline. One low-pressure fuel injector was arranged at a compressor outlet of a turbocharger in an intake manifold, to inject the No. 93 gasoline into the intake manifold, at an injection pressure of 600 KPa, wherein the air-fuel ratio in the intake manifold was 146:1. The specific operating steps of the internal combustion engine were as follows. To start with, in a pre-injection stage performed outside of the cylinder, during an intake stroke, the piston moved from a top dead center to a bottom dead center, inhaling an oil and gas mixture composed of the No. 93 gasoline and air, with an air-fuel ratio of 146:1. Next, in the pre-injection stage performed inside of the cylinder, during a compression stroke, when the engine rotated at a low speed (lower than or equal to 3000 r/min), the fuel injector (A) injected the No. 93 gasoline twice into the cylinder, at fuel ratios of 140:1 and 73:1, respectively; while when the engine rotated at a high speed (higher than 3000 r/min), the fuel injector (A) injected the No. 93 gasoline once into the cylinder. After that, in a primary injection stage, before the piston reached the top dead center during the compression stroke, and when, for example, the engine rotated at 2800 r/min and the injection phase was at a 77° CA, the fuel injector (B) injected the No. 40 gasoline into the cylinder, with an air-fuel ratio of 70:1. The No. 40 gasoline fuel injected during the primary injection stage diffused and spontaneously ignited in the high-temperature and high-pressure oil and gas mixture in the cylinder. The oil and gas mixture that spontaneously ignited, containing a portion of the No. 93 gasoline pre-injected into the cylinder, produced a flame to ignite the oil and gas mixture comprising the No. 93 gasoline pre-injected into the cylinder in three injections, in a manner of multi-point ignition at a high ignition strength. As a result, the premixed oil and gas mixture burned very fast, without causing any phenomenon of detonation or knocking due to a low concentration of fuel therein.

The turbocharger was used to supply high-pressure air into the intake manifold, to cause a boost pressure in the range from 100 to 240 KPa.

In a low-temperature start and low-load operation stage under a conventional spark plug ignition and combustion control mode, No. 93 gasoline, as the only fuel, was injected into the cylinder by the fuel injector (A) during the intake stroke as per a conventional control procedure, with an equivalence ratio of 1:1 as the basic air-fuel ratio. The spark plug was used to ignite the homogeneous premixed oil and gas mixture. Alternatively, the fuel was injected during the compression stroke, or the concentration of fuel can be appropriately increased, especially during cold start of a vehicle in winter, which belongs to the prior art.

EXAMPLE 3

A vacuum insulation jacket assembly was manufactured with a stainless steel sheet material, for covering or wrapping an outer layer of an exhaust pipe or device necessary to be insulated. Two vacuum jackets with semi-circular cross-sections were wrapped around the exhaust pipe, and fixed to the exhaust pipe with hoops. And two vacuum jackets, including an upper one and lower one, were combined and wrapped around an exhaust manifold, to form close and complete coverage over the exhaust manifold. The exhaust devices such as a turbocharger, a three-way catalytic treatment device, and a soot treatment device were similarly wrapped and insulated.

The vacuum insulation jacket assembly for an exhaust-driven portion of the turbocharger employed two semi-circular vacuum jackets, which formed a ring after being assembled, and were wrapped around the exhaust-driven portion of the turbocharger. The two semi-circular rings were independent of each other, with an intermediate vacuum sandwich. The higher the vacuum degree of the sandwich was, the better the insulation effects would be.

The procedure of manufacturing the stainless steel vacuum insulation jacket assembly is known in the art. Other low-cost metal sheets can be used to replace the stainless steel sheet, for manufacture of the vacuum insulation jacket assembly.

EXAMPLE 4

With respect to a manufacturing procedure of the vacuum sandwich in the exhaust-driven portion of the turbocharger, when the exhaust-driven portion of the turbocharger was being cast, it was added with a sandwich (double-layer) structure on an outer surface thereof, with a small gap or a small hole being reserved for vacuum pumping. During post processing of the casting, when the sandwich structure was in a vacuum or relative vacuum state, the small gap or small hole was sealed via machining operations in vacuum environment.

The parameters of the engine and the control parameters as listed in the above examples represent an operating state only, and function as examples to prove applicability of the present invention, and as guidance and reference for those skilled in the art in implementing the present invention. They do not cover all parameters or states of the present invention. The internal combustion engines within the scope of the present invention include but are not limited to four-stroke, two-stroke, and six-stroke internal combustion engines.

The processing method as listed in the above examples constitute one implementing method only, and specific methods for those in the art to implement the present invention are not limited hereto.

The low-octane gasoline according to the present invention is typically defined to be gasoline having an octane number lower than 69, while the high-octane gasoline of the present invention is generally defined to be gasoline having an octane number higher than 69 (69 being excluded). During implementation of the present invention, the octane index of the high-octane gasoline, which is injected in the pre-injection stage and included in the premixed oil and gas mixture, is not restricted by such a general definition.

The invention claimed is:

1. A homogeneous charge compression ignition and diffusion compression ignition combined ignition control method for low-octane gasoline,
wherein a cylinder has a compression ratio in the range from 12:1 to 22:1, and a low-octane gasoline with an octane number lower than 69 are used,
wherein the fuel is injected in two stages, including:

a first stage termed pre-injection stage, which can be completed in: either one single injection during an intake stroke of an internal combustion engine, wherein a part of the fuel is injected into the cylinder and premixed with air; or in a plurality of injections, a last of which occurs during a compression stroke after a piston passes a bottom dead center and before a primary injection stage occurs, and a second stage termed primary injection stage, which occurs during the compression stroke, comprising: injecting, before the piston approaches a top dead center, a part of the fuel into the cylinder, followed by diffusion and spontaneous ignition of an fuel and air mixture containing such fuel in high-temperature and high-pressure air in the cylinder, wherein a phase of the primary injection stage determines ignition time, in accordance with such a principle that an exothermic center is positioned after and as close as to the top dead center, wherein the fuel and air mixture that spontaneously ignites generates a flame to ignite a non-ignited portion of the fuel and air mixture that is formed by the fuel injected into the cylinder and premixed with air in the pre-injection stage, at a high strength and in a manner of multi-point ignition, such that the premixed fuel and air mixture is ignited, to achieve ignition and combustion of a homogeneous lean fuel, which will be subjected to multi-point spontaneous ignition, as the temperature and the pressure rise in the cylinder, so as to achieve homogeneous charge compression ignition thereof, wherein a concentration of fuel in the premixed fuel and air mixture has a maximum value, as an upper limit, that enables non-occurrence of spontaneous ignition thereof during the compression stroke, and a minimum value, as a lower limit, that enables successful ignition and combustion thereof during a power stroke by the flame of the fuel injected in the primary injection stage, wherein during a low-load operation, an engine is controlled as per a single diffusion compression ignition and combustion control mode, which means that only primary injection of the fuel occurs, without occurrence of any pre-injection or supplementary injection, wherein as an alternative of the pre-injection stage or the first injection performed in the pre-injection stage, the fuel can be injected into an intake manifold or intake duct, to be premixed with air and form a low-concentrated homogeneous fuel and air mixture, which then enters the cylinder, and wherein as a supplementary or optimized solution of the above technical solution, one or more of the following technical measures can be selected:

1) partially recycling exhaust gases, which are mixed with fresh air, and enter the cylinder, or partially retaining the exhaust gases in the cylinder at the end of an exhaust stroke;
2) increasing intake pressure of the cylinder with a turbocharger or a mechanical supercharging device, or with the turbocharger and the mechanical supercharging device simultaneously;
3) using, in a low-temperature start-up or low-load operation stage, a conventional spark plug ignition and combustion control mode;
4) pre-heating air with an electric heater in a low-temperature start-up stage; and
5) pre-heating the fuel with an electric heater, so that, after being injected into the cylinder, the fuel can be more readily diffused, or can more readily ignite in the case of the primary injection stage.

2. The homogeneous charge compression ignition and diffusion compression ignition combined ignition control method according to claim 1, comprising injecting the fuel in three stages, including:
   a first stage termed pre-injection stage, which can be completed in one injection during the intake stage, or in two or three injections, a last of which occurs during the compression stroke and before a primary injection stage;
   a second stage termed primary injection stage, which occurs during the compression stroke before the piston approaches the top dead center, to achieve diffusion compression ignition, wherein the phase of the primary injection stage determines ignition time in accordance with such a principle that an exothermic center is positioned after and as close as to the top dead center; and
   a third stage termed supplementary injection stage, which occurs during the power stroke after the piston passes the top dead center by a 0-60° CA.

3. The homogeneous charge compression ignition and diffusion compression ignition combined ignition control method according to claim 1, comprising using two fuel injectors to alternately or simultaneously inject fuel into each cylinder, so as to facilitate achievement of multiple injections at a high-speed operation state of the engine.

4. The homogeneous charge compression ignition and diffusion compression ignition combined ignition control method according to claim 1, comprising using two different fuel injectors, of which a low-pressure fuel injector injects fuel into the intake manifold or the intake duct, and a high-pressure fuel injector injects fuel into the cylinder.

5. The homogeneous charge compression ignition and diffusion compression ignition combined ignition control method according to claim 3, wherein using two fuel injectors to inject fuel into each cylinder comprises injecting two types of gasoline with different octane numbers, wherein:
   high-octane gasoline is injected by one fuel injector and premixed with air,
   and
   low-octane gasoline is injected by the other fuel injector, with an injection phase in the compression stroke before the piston reaches the top dead center, which constitutes the primary injection stage and performs a function of ignition, in such a manner that the low-octane gasoline is diffused and compressively ignited, thus to ignite the premixed fuel and air mixture containing the high-octane gasoline, and generate the exothermic center after and close to the top dead center; or alternatively,
   a three-stage injection procedure is used, among which a third stage constitutes the supplementary injection stage, comprising injecting high-octane gasoline into the cylinder during the power stroke as a supplement.

6. The homogeneous charge compression ignition and diffusion compression ignition combined ignition control method according to claim 5, comprising a procedure of controlling fuel injection, wherein two fuel injectors are used to inject two types of gasoline with different octane numbers into each cylinder, and meanwhile a fuel injector is added to the intake duct or the intake manifold, for injection of high-octane gasoline, as a part of pre-injection of fuel.

7. An internal combustion engine which is operated with the method according to any one of claim 1.

* * * * *